United States Patent Office 2,809,493
Patented Oct. 15, 1957

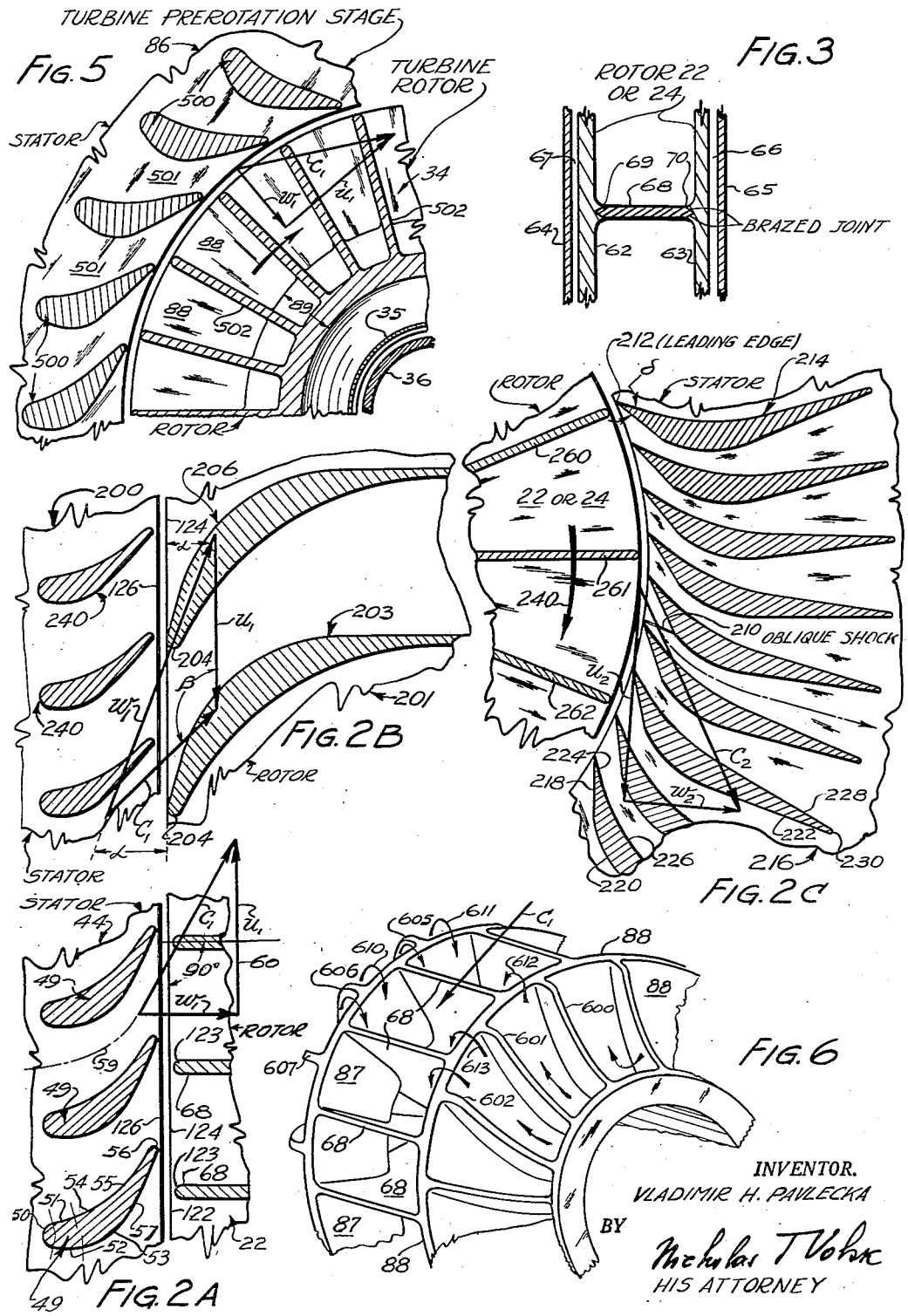

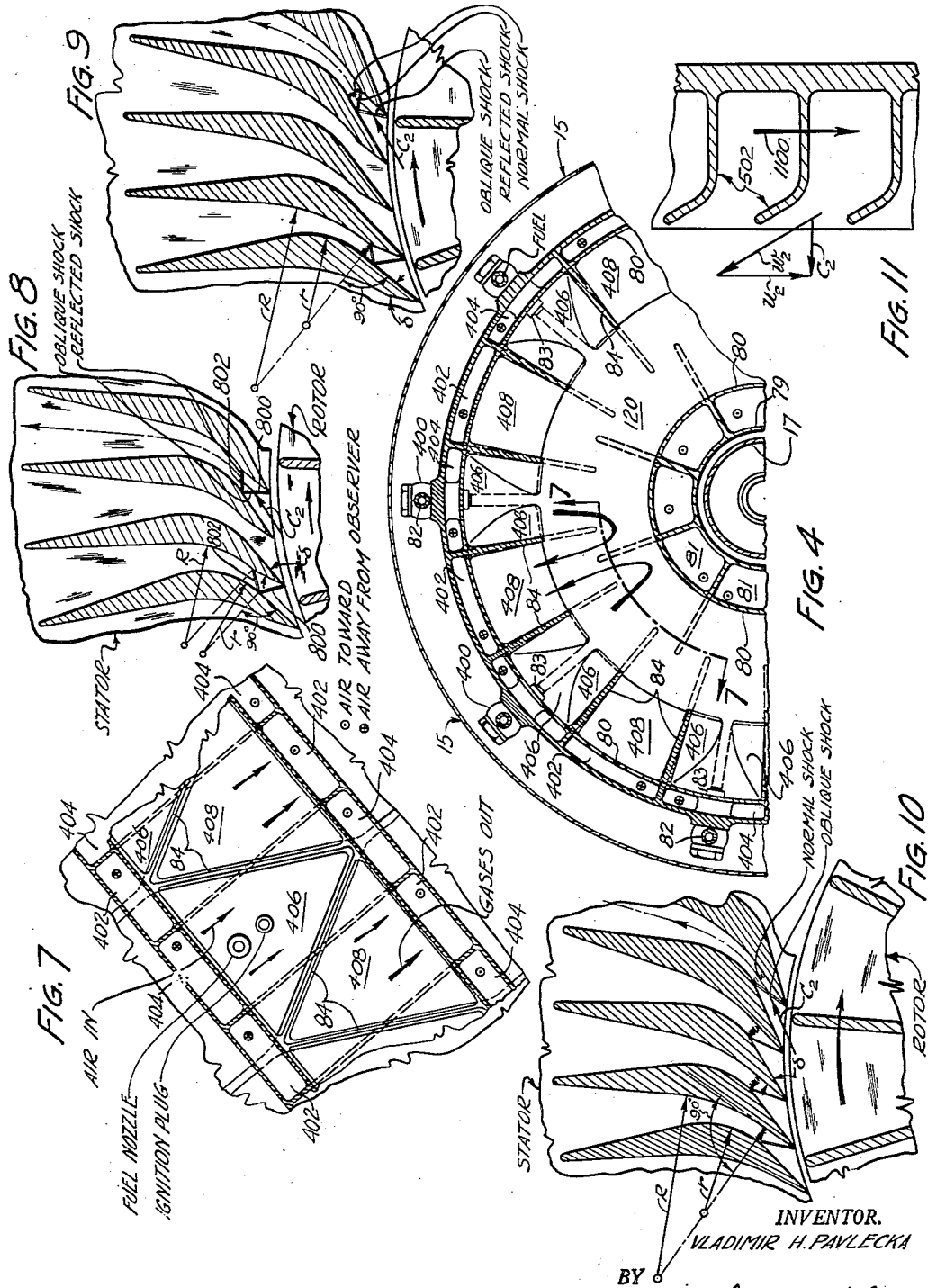

2,809,493

CENTRIFUGAL FLOW COMPRESSOR AND GAS TURBINE POWER PLANT WITH A CENTRIFUGAL FLOW COMPRESSOR, TOROIDAL COMBUSTION CHAMBER, AND CENTRIPETAL FLOW TURBINE

Vladimir H. Pavlecka, Pacific Palisades, Calif., assignor to American Machine & Foundry Company, a corporation of New Jersey Application March 19, 1951, Serial No. 216,305

21 Claims. (Cl. 60—39.36)

This invention relates to gas turbine power plants and more particularly to the gas turbine power plants utilizing two serially connected centrifugal flow compressors discharging into a toroidal combustion chamber and a centripetal flow turbine.

It is an object of this invention to provide a gas turbine plant having two serially connected centrifugal flow compressors, a stationary toroidal combustion chamber and a dual flow centripetal flow turbine.

It is also an object of this invention to provide a novel centrifugal compressor with a stationary prerotation stage and a supersonic diffuser.

It is also an object of this invention to provide novel rotors for centrifugal compressors and centripetal turbines comprising two steel disks and a plurality of compressor vanes brazed together into a unitary structure.

It is also an object of this invention to provide a novel power plant including a centrifugal flow compressor, or toroidal combustion chamber and a centripetal turbine having centripetal flow vanes mounted in a casing, and centrifugal flow compressor vanes mounted on the outer surface of the casing, or along its outer walls, for cooling its outer walls with a stream of cold air which allows the operation of this turbine at higher temperatures and higher peripheral velocities.

The disclosed gas turbine power plant is especially suitable for medium and small horsepower ratings. One of the most important disadvantages of the power plants in this class, is that the gas turbine power plants have relatively low compression ratio produced by the compressors used by the power plants in this class. It is generally considered that the compression ratios of the order of 2 to 1 or 3 to 1 are reasonably good compression ratios. Although it is known to those skilled in the art that higher thermodynamic efficiency is obtainable only if higher compression ratios are used, such higher compression ratios are not realized because it is felt that the resulting mechanical complications are too onerous to justify the gain in the compression ratio.

In the disclosed power plant, a compression ratio of the order of 10 to 1 or higher is obtainable with a simple compressor structure and simple compounding configurations. This gain in the compression ratio is obtained not only through compounding of the two compressor stages but also by improving the overall fluid dynamic efficiency of the centrifugal compressor by providing a prerotation stage and a supersonic diffuser for such compressors.

It is a well known principle of thermodynamics that, according to Carnot's law, higher thermodynamic efficiencies are obtainable with any power plant if the fluid used for transfer of energy is raised to a temperature which is as high as it is possible to use with known available materials. Accordingly, it is also desirable to attain as high a temperature as possible at the output of the combustion chamber as long as the turbine can withstand these temperatures. In the disclosed power plant the centripetal turbine is provided with the centrifugal compressor blades, mounted on the outer surface of the turbine casing, for circulating cold air around the outer walls of the turbine which allows one to operate the turbine at substantially higher temperatures than those used with the centripetal turbines known to the prior art. Moreover the disclosed turbine is provided with a single entry and a dual exit, this construction permitting the realization of relatively high horse power turbine with the minimum amount of metal and minimum volumetric displacement.

One of the advantages of the power plant also resides in the fact that the entire power plant, including all the auxiliaries, utilizes only 2 main bearings, with one bearing being an anchor bearing while the other bearing is axially displaceable. This permits a simple mechancal alignment of the entire structure, which inherently is devoid of any expansion difficulties.

The power plant, moreover, has substantially zero side-thrust because of the symmetry of the compressor as well as the symmetry of the turbine structures.

The novel features which are believed to be characteristic of the invention, both as to its organization and method of operation, together with further objects and advantages thereof, will be better undertsood from the following description taken in connection with the accompanying drawings in which several embodiments of the invention are illustrated as examples of the contemplated invention. It is to be expressly understood, however, that the drawings are for the purpose of illustration and description only, and are not intended as a definition of the elements of the invention. Referring to the drawings:

Fig. 2A is the cross sectional view of a portion of the compressor taken along an arcuate line 2—2 illustrated in Fig. 1.

Fig. 2B is, like Figure 2A, the cross-sectional view of a portion of a different version of the compressor taken along line 2—2, illustrated in Fig. 1.

Fig. 2C is the cross-sectional sideview of the upper part of the rotor and of the diffuser taken along line 2C—2C illustrated in Fig. 1.

Fig. 3 is a portion of the cross sectional view of the compressor taken along line 3—3 shown in Fig. 1.

Fig. 4 is a vertical cross sectional view of the combustion heat generator taken along line 4—4 shown in Fig. 1.

Fig. 5 is a vertical cross sectional view of the turbine taken along line 5—5 shown in Fig. 1.

Fig. 6 is a perspective view of a portion of the centripetal turbine rotor.

Fig. 7 is a peripheral view of combustion heat generator taken along an arcuate line 7—7, illustrated in Fig. 4.

Fig. 8 illustrates a diffuser channel for oblique and reflected shocks.

Fig. 9 illustrates a diffuser channel for oblique, reflected and normal shocks.

Fig. 10 illustrates a diffuser channel for oblique and normal shocks.

Fig. 11 illustrates a cross-sectional plan view of the turbine blades at one exit of the turbine.

Figure 1:
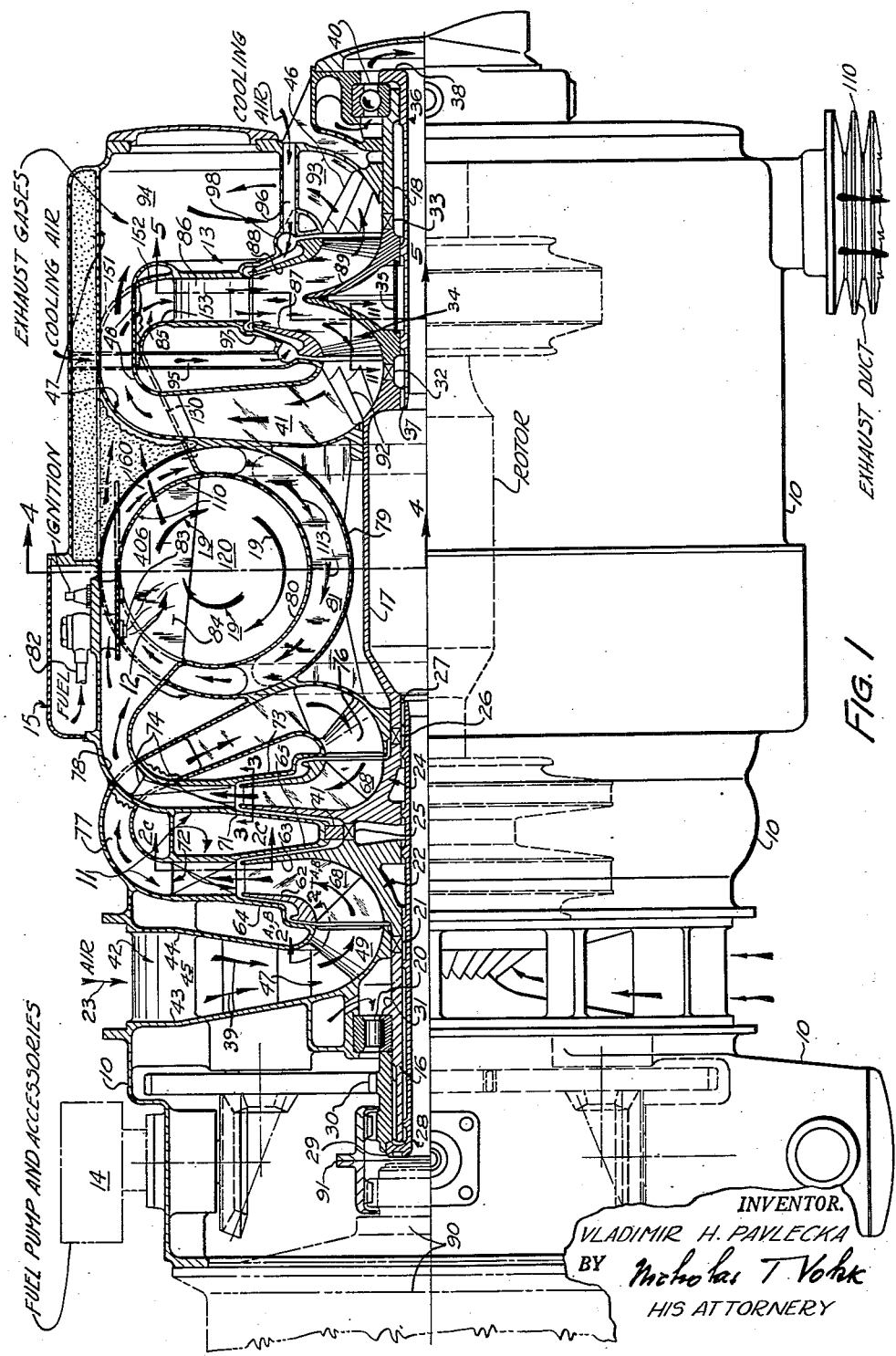
Fig. 1 is a longitudinal elevational view, partly in section, of the power plant.

Referring to Fig. 1, the power plant is integrated into a single unit by means of a frame 10 which holds together the centrifugal compressor 11, the combustion heat generator 12, and the centripetal turbine 13 as well as the auxiliaries 14. The frame is also used for supporting a compound shaft consisting of shaft members 16, 17, and 18. Shaft member 16 is supported by a roller bearing 20 mounted on the frame member 10. Shaft member 16 is a hollow shaft whose inner end terminates in a Gleason Curvic Shaft Splice 21 engaging the first compressor rotor 22. The first compressor rotor 22 is connected to the second compressor rotor 24 by means of Curvic splice 25. The second rotor 24 of the compressor is connected through Curvic splice 26 to the central portion 17 of the shaft. The central portion 17 of the shaft represents a hollow cylinder which is threaded at 27, for making a threaded engagement between the shaft portion 17 and a hollow bolt 28 provided with a flange 29. Flange 29 of bolt 28 engages splined coupling 30 which presses against bearing 20, the latter in turn pressing against a flange 31 provided on shaft portion 16. In this manner the entire compound shaft structure is integrated into a single mechanically rigid assembly. The same type of mounting is also used on the other side of the power plant, Curvic splices 32 and 33 being used for interconnecting shaft portions 17 and 18 and a rotor structure 34 of the turbine. As in the prior case, a hollow bolt 36 makes a threaded engagement 37 with the central portion 17 of the shaft, while its flange portion 38 engages the thrust bearing 40. This bearing is mounted between the shaft member 18 and the frame member 10. The above type of shaft structure is light and it also permits integration of a large number of independent elements into a single rigid mechanical element capable of transmitting large torques without any possibility of shearing and without stress concentrations on the shaft. Moreover, the structure possesses excellent self-alignment characteristics.

Proceeding now with the description of the compressor structure, the air to be compressed enters a circumferential or annular duct 42 composed of side walls 43 and 44 and a plurality of radial ribs 45 uniformly distributed around the periphery of the duct. These radial ribs 45 also act as structural members for holding together the frame structure 10. After passing through duct 42, the air continues in the radial, centripetal direction until it encounters a stationary prerotation stage 47. The prerotation stage is also illustrated more clearly in Figure 2A. The prerotation stage consists of the wall members 43 and 44 and a plurality of blades such as blades 49 uniformly distributed around the entire periphery of the prerotation stage. These blades are brazed to the wall members 43 and 44 of frame 10 as illustrated more clearly in Figure 1. The blades themselves represent rather sharply curved, or cambered, air foils which are shaped so as to produce acceleration flow-channels between the opposite surfaces of the blades. Each blade begins with the cylindrical surface 50 which merges into flat surfaces 51 and 52. Flat surface 52 merges into a cylindrical convex surface 53 while flat surface 51 merges into a cylindrical concave surface 54. Surface 54 merges into a flat surface 55 which in turn terminates in a cylindrical surface 56. The cylindrical surfaces 53 and 56 are joined together by means of a curved convex surface 57. The blades are spaced with respect to each other so as to form a flow-channel having a median flow-line 59 which begins as a centripetally directed line represented by arrows 23 and 39 in Fig. 1. It then gradually changes its direction from the radially centripetal direction to the direction which is parallel to the axis of rotation of the power plant at the central portion of the stage and then it turns gradually in the direction of rotation of rotor 22 of the centrifugal compressor at the output side of the stage. The direction of rotation of rotor 22 is indicated by a rotational velocity vector $U_1$ which is also numbered as vector 60 in Figure 2A. In this version of the prerotation stage the prerotation is in the direction of rotation of the rotors 22 and 24 of the compressor, which permits reshaping of the rotor blades 68 so that their axes form a 90° angle with the edge 122, Figure 2A, of the rotor. The leading edges 123 of the compressor blades 68, therefore, lie in a plane perpendicular to the axis of rotation of the power plant. This plane is defined by a line 124 in Fig. 2A which corresponds to the vertical edge of rotor 20. The lagging edges 56 of the blades 49 also lie in the vertical plane represented by a line 126 in Fig. 2A which corresponds to the vertical end-surface of the prerotation stage. These two adjacent vertical planes are also visible in Fig. 1 as two vertical lines 124 and 126. The same is also true of the lagging edges of the airfoils 240 and the leading edges 204 of the compressor vanes 206 and 203 in Fig. 2B and, therefore, the lines 126 and 124 are similarly numbered in Fig. 2B. Fig. 2B will be described more in detail later. Thus, the introduction of the prerotation stage in this version of the compressor produces simpler compressor blades and it also preaccelerates the incoming air for shockless axial entry into the rotor. The above is represented by the vector triangle $C_1U_1W_1$ where $C_1$ is the absolute air velocity, $U_1$ is the average peripheral velocity of the rotor, and $W_1$ is the relative velocity of the air, or the velocity at which the rotor blades 68 will "see" the air entering the compressor. One, at once, observes that vector $W_1$ is parallel to the axis of rotation and is parallel to the sides of the blades 68, and therefore there will be shockless entry of air into the rotor of the compressor. This vector diagram also illustrates the amount of prerotation desired from the prerotation stage; $W_1$ should preferably be parallel the axis of rotation, which can be readily accomplished by changing the angle of $C_1$. In the prior art complex curved blades are used for "scooping" the air into the compressor. Figure 1, and especially 2A, illustrate that more accurate channelizing of air flow can be accomplished by using a stationary prerotation stage. Thus there are several advantages obtained with the disclosed structure: it is mechanically simpler and cheaper to produce; it also enables one to introduce the desired magnitude of acceleration to the air entering the compressor and also to give the desired direction to this acceleration for shockless axially directed entry of this air into the rotor of the compressor. It thus transforms at times aimless churning of air into a channelized flow which can be represented in terms of strict vectorial relationship with respect to the remaining geometry of the compressor. Because the entry into the centripetal compressor has a small cross-sectional area, which is smaller than the cross-sectional area at any other part of the compressor, the prerotation stage must be devised so as not to diminish this input area still further. In such case the breathing capacity of the compressor is reduced still further to the detriment of the compressor. Moreover, the prerotation stages having very low breathing capacity inherently are very inefficient fluid dynamically and do more harm than good to the overall performance of the compressor. The above difficulties can be avoided by introducing the air first in a radially centripetal direction and then altering this direction to the axial direction in the prerotation stage. In this manner the breathing capacity of the prerotation stage is never smaller than the breathing capacity of the compressor at the entry into the compressor. By far the larger part of the prerotation stage has a larger breathing capacity and, therefore, low losses. The flow of the working fluid, as it leaves the prerotation stage, has an axial velocity vector component $W_1$ which is the relative entry velocity into the rotors in Fig. 2A. As mentioned previously, this velocity $W_1$ is parallel to the compressor vanes 68. The other velocity component $U_1$ completes the right triangle $C_1U_1W_1$.

The first rotor 22 of the centrifugal compressor, when viewed in the manner illustrated in Fig. 3 (the view of the two rotors 22 and 24 are identical to each other at plane 3—3) consists of a side wall 62, a second side wall 63 placed between the outer stator walls 64 and 65. All of these walls are also illustrated in Figure 3. Small air gaps 66 and 67 are provided between the walls of the rotor and the walls of the stator. Only a small amount of air escapes through this gap because of the distribution of the pressures as well as velocities of the air at the inner and outer ends of these gaps. The rotor walls 62 and 63 are integrated into a single unit by means of the rotor blades 68 which are brazed to the disk walls 62 and 63 by means of joints 69 and 70 which have V-shaped cross sections as illustrated in Figure 3. Two V-shaped extensions are provided on the walls 62 and 63 for connecting the compressor blades or vanes 68 to the disks. The V portions of the vanes terminate at the surface of the disk and do not penetrate into the disk. In view of the above, the disk structures are not weakened since the weld is not introduced into the disk itself. The same type of structure is used for making rotor 24.

One version of the centrifugal compressor i. e. that illustrated in Figures 1 and 2A, is provided with conventional diffusers 72 and 74, which transform the kinetic energy into potential energy. The output of diffuser 72 is connected to the prerotation stage 76 of the second stage of the compressor through a plurality of ducts 77 uniformly distributed around the periphery of the diffuser 72. Ducts 77 are interlaced, or intermeshed, with the ducts 78, which connect diffuser 74 of the second compressor stage to the combustion chamber 12. A labyrinth seal 41 is provided between the two compressor rotors to prevent air leakage from the high compression side to the low side.

From the above description of the compressor, it follows that it has two distinct and separate rotors oriented with respect to each other so that they are "back-to-back," although the latter expression is not used here to convey the meaning that the two "backs" touch each other, since they do not, and the two rotors are completely surrounded by two side walls 64, 65 and two similar side walls 71 and 73 for the second rotor 24. The above construction has a number of advantages: Seal 41 is of small diameter, the compressor stages are "ambidextrous," thus simplifying their construction, and the prerotation stages, being centripetal and axial, do not impede the breathing capacity of the compressor.

The compressed air, after leaving diffuser 74 and the plurality of the peripherally distributed ducts 78, enters combustion chamber 12. The chamber consists of an outer toroidal shell 79 and an inner toroidal shell 80. The two toroids are spaced from each other, the space between the two shells being used as a cold air duct 81 for circulating the cold air around the outer surface of the inner toroid. The inner toroid 80 constitutes the toroidal combustion chamber 120 proper. Fuel ducts 82 are connected to respective fuel nozzles 83 which are uniformly distributed over the periphery of the combustion chamber as illustrated in Fig. 4. The two toroids are displaced from the concentric position to make duct 81 a constant velocity duct.

The combustion chamber toroid is provided with a plurality of ribs 84 which form a plurality of entry and exit ports permitting the air to enter the inner toroid, where it forms a free stationary vortex and where burning of fuel takes place. The hot gases, upon their diffusion toward the wall 89 of the toroid, leave it by way of the exit ports. These hot gases then enter a turbine input duct 85 which has a plurality of turbine input branch ducts 85a 85b, 85c, etc. only one duct 85 is visible in Fig. 1, uniformly spaced around the periphery of the power plant.

Ducts 85, 85a, etc. convey the hot gases to a turbine prerotation stage 86 and then to the rotor 34 of the turbine.

Figure 4 illustrates the cross-sectional view of the combustion chamber. The outer jacket 15 surrounds the fuel pipe terminals 400 and the ignition system. Ducts 402 are cold air ducts used for cooling the chamber. They are connected on their output side to the exhaust ducts 85, Fig. 1. The area of the duct portions 402 is substantially equal to the duct portions 81 so that the compressed air flowing around the inner toroid 80 would have traveled at a substantially uniform speed if it had remained at a constant temperature. Because of the increase in its temperature, there is an increase in speed as this air travels around the toroid. Ducts 404 are also cold air ducts, which are connected to the ducts 78, Fig. 1. Therefore cold air enters ducts 404 after leaving ducts 78, then travels around the toroid and leaves the toroid (its outer wall) through the common duct 81, ducts 402 and then ducts 85. The cold air enters the inner toroid proper 120 via ducts 78 and then a plurality of entry, or input, ports 406, Figures 4 and 7, and then travels around the toroid in the direction illustrated by arrows 19 in Figure 1. It then leaves the toroid via exit ports 408 which alternate in their locations with the input ports 406, as illustrated more clearly in Figs. 7 and 4. The entry ports and the exit ports are separated from each other by means of wall members 84 which follow a zig-zag path, as illustrated more plainly in Figure 7.

The turbine rotor consists of two outer wall members 87 and 88, and an inner wall member 89, all of the above members being compound curvature members, i. e., the surfaces of these walls are the surfaces of revolution. The turbine blades are placed between the walls of the turbine and are shaped to match the three wall members 87, 88 and 89 and are curved in the direction opposite to the direction of rotation of the turbine rotor to provide reaction surfaces which convert kinetic energy of gases into mechanical work. This work is used for driving the compressor and to furnish useful torque available at the drive shaft 90 connected to the composite shaft 16—17—18 through a flexible coupling 91. The gases, upon leaving the gas turbine, enter the annular ducts 93, and 41 having radial vane 92, and 46 and these ducts convey the gases to an annular exhaust chamber 94 whereupon these gases enter ambient atmosphere through a discharge duct 110.

Duct 93, upon its reaching the circumferential duct 85, is split into a plurality of the circumferentially positioned branch ducts 93a, 93b, 93c, etc. The circumferential duct 85 is also split into a plurality of the branch ducts 85a, 85b, 85c, etc., which are interlaced or intermeshed, in alternating manner, with the branch ducts 93a, 93b, 93c, etc. It becomes necessary to interlace, or intermesh, in alternating manner, the two branch ducts because only the use of such an intermeshed structure enables one to convey the hot gases in the centripetal direction into the centipetal turbine 34, and also convey the exhaust gases into ambient air from the left portion (as viewed in Fig. 1) of the turbine 34. Accordingly, the circumferential duct 93 must cross, or intersect, the circumferential duct 85 and such intersection can be obtained only by resorting to the "branch duct" configuration described above. The branch duct 93a is illustrated in cross-section view in Fig. 1, while the branch duct 85a is illustrated by the dotted lines 150 and 151 which are connected to the side walls 152 and 153 of the circumferential duct 85 upon its emergence from the region of its intersection with duct 93.

The turbine has a single intake and a double exit, as illustrated in Figures 1 and 6. As stated previously, such turbine construction is capable of expanding gases to a low exhaust pressure within one stage because a large expansion ratio is possible with the dual exit. The structure may be considered as the conversion of the single stage turbine into a two-stage turbine half-way through the first portion of the turbine stage. Thus the volumetric displacement of the turbine, as one progresses from the prerotation stage 86 into the single entry part of the turbine and then into the dual exit, conforms with the volumetric state or density state of the gases: high initial density needs only a single entry, and low exhaust density is made possible by using a dual exit principle. The turbine is especially suitable for power plants where relatively high compression ratios are available, which is the case here because of the use of the serially connected two compression stages and supersonic diffusion, as will be described later.

Since the temperature of the gases entering the rotor of the turbine may be of the order of 825° C. to 850° C., the turbine structure is provided with a cooling system which is obtained by introducing a cold air stream around the outer and inner surfaces of the outer wall members 87 and 88. To obtain the above, a plurality of intake ducts such as ducts 95, 96, etc. (only two ducts 95 and 96 are visible in Fig. 1) are located on both sides of the turbine, which introduce cold ambient air into a centrifugal compressor located in an air jacket formed by the spacings between outer jacket walls 97 and 98 and the turbine walls 87 and 88.

The compressor is mounted on the outer turbine walls, as illustrated more clearly in Fig. 6 where the compressor blades are shown at 600, 601, 602, etc. and 605 through 607, etc. Since the main gas expansion takes place in the prerotation stage 86, a single stage compressor is sufficient to raise the air pressure to that of the gases entering the turbine. The cold air then is turned around the peripheral edges of the turbine, as illustrated at 610 through 613 in Fig. 6 and is then syphoned into the turbine by the jets of compressed and heated gases emanating from the prerotation stage 86. The cold air will tend to follow the outside walls 87 and 88, and thus keep them cooler than they would have been otherwise.

A portion of the cross-sectional view of the turbine and prerotation stage are illustrated in Fig. 5. The prerotation stage 86 consists of a plurality of blades 500 uniformly distributed around the periphery of the prerotation stage. The shape of these blades is similar to the blades 49 in Fig. 2 and, therefore, needs no additional description. They also perform the same function as the blades of the prerotation stage of the compressor, i. e. prerotation of the fluid so that it enters the turbine rotor 34 in proper vectorial relationship. The flow channels 501 are acceleration channels which convert the energy of pressure into the energy of motion i. e. kinetic energy, which is converted into mechanical work in the turbine rotor. In Fig. 5, the outer wall of the rotor appears at 88; the turbine blades are shown at 502, and the central member 89, otherwise called the inner wall member 89, is only partly visible in Fig. 5. Also visible, in section, are the hollow bolt 36 and a ring member 35 which keeps high temperature radiation from bolt 36 and also acts as a reinforcing ring preventing the wall member 89 from buckling under load imposed by bolt 36.

A velocity vector diagram for the turbine is illustrated in Fig. 5. It indicates that the relative entry velocity $W_1$ is made radial and parallel to the turbine blades 502. This is accomplished by turning or curving the prerotation stage blades 504 so that the absolute exit velocity $C_1$ and the peripheral velocity $U_1$ will place $W_1$ in radial relationships with respect to the turbine rotor.

Fig. 11 discloses the cross-sectional plan view of the turbine blades 502 at one exit of the turbine, the other exit of the turbine being identical to that illustrated in Fig. 11 but opening in the opposite direction. The blades are curved in the direction opposite to the direction of rotation of the rotor which is illustrated by an arrow 1100. The curvature is proportioned to produce purely axial exit of the exhaust gases; such axial exit will also produce optimum energy conversion. This axial exit is illustrated by the absolute exit velocity $C_2$ in Fig. 11.

Figures 2B and 2C illustrate another version of the centrifugal compressor in which the prerotation stage 200 produces a contra-prerotation of the incoming air. In Fig. 2B the air leaves the prerotation stage with absolute velocity $C_1$ which makes an obtuse angle $\beta$ with the peripheral velocity $U_1$. Therefore, the relative velocity $W_1$ in Figure 2B is much larger than the same velocity in Figure 2A. This is so because in Figure 2B rotor 201 is rotating in the direction opposite to the direction of the prerotation obtained in the prerotation stage 200. The direction of rotation and the magnitude of the rotational velocity is indicated by the velocity vector $U_1$. Since now the air enters the rotor 201 at a much higher relative velocity $W_1$, which makes a sharp angle $\alpha$ with the entry plane of the compressor, it becomes necessary to turn the leading edges 204 of the rotor blades 206 and 203 in the direction of rotation. The degree of turning is determined by the direction of the relative velocity $W_1$, which is perpendicular to the surface of the cylindrical leading edges 204 of the blades. The remaining surfaces of the blades are airfoils with convex and concave cylindrical surfaces both of which merge into respective flat surfaces. The flow channel, defined by the opposed blade surfaces, is a curved diffusion channel which is curved not only in the plane of the drawing but also in the plane at right angles to the plane of the drawing. This last curvature is illustrated in Figure 1 by the curvature of the side walls 62 and 63 and the corresponding curvature of the vanes or blades 68 as they are seen in Fig. 1. All of the surfaces are available for controlling the degree of diffusion obtained in the channel, which in turn will control to some extent, the relative exit velocity $W_2$ and the absolute exit velocity $C_2$. In the disclosed version of the compressor, $C_2$ is a supersonic velocity so that it will produce at least an oblique shock 210 upon encountering the sharp leading edge 212 of the blades 214 located in the diffuser 216. The blades 214 have flat surfaces 218, which are parallel to the absolute velocity $C_2$ so that this surface does not produce any oblique shock in the air flow. This flat surface then merges into a cylindrical convex surface 220 which in turn merges into a flat surface 222. The other surface of the blade begins at the leading edge 212, this edge being formed by the intersection of two flat surfaces, 218 and 224, the latter merging tangentially into a cylindrical, concave surface 226. Surface 226 then merges into a flat surface 228. Neither the leading edge 212 nor the lagging edge 230 is an infinitely sharp edge in order to make both of these edges practicable; both have finite radii to prevent their vibration, premature wear and bending or warping. Angle $\delta$ is not especially critical and is selected to produce an oblique shock with respect to velocity $C_2$. For a discussion of this angle, reference is made to pages 110–113, Section 5.4 of "Supersonic Aerodynamics" by Edward R. C. Miles, McGraw-Hill Book Company, 1950 edition.

The number and the type of shocks obtained in the diffuser 216 depends on the magnitude of velocity $C_2$. Ordinarily, $U_2$ is sufficiently high to produce an oblique shock 210 but is not high enough to produce an oblique and reflected shock. However, it should be understood that the disclosed diffuser is equally capable of transforming the absolute velocity $C_2$ into pressure by producing an oblique shock and a reflected shock. In the latter case angle $\delta$ becomes smaller and there is a sharp edge formed between the flat surface 224 and the concave surface 226, which anchors the position of the reflected shock. The geometry of the diffuser of this type is illustrated in Figure 8 where the oblique and reflected shocks are illustrated at 800 and 802, respectively. Figure 9 illustrates the channel geometry for the oblique, reflected and normal shocks, while in Figure 10 oblique and normal shocks are illustrated. The possibility of having $C_2$ sufficiently high so as to produce a plurality of successive shocks (Figs. 8 through 10) is remote because of the limits imposed on $U_2$ by the strength of available materials. For a more detailed discussion of the type of channels disclosed in Fig. 2C, and Figs. 8 through 10, reference is made to my copending application entitled "Supersonic Centripetal Compressors," Serial No. 529,504, filed August 19, 1955 and especially Figs. 11 through 14 of the above application, which is made a part of this disclosure. (Application Ser. No.

529,504 is a divisional application of parent application Ser. No. 217,347, filed March 24, 1951.)

The compressor illustrated in Figs. 2B and 2C has one advantage over that illustrated in Fig. 2A: a higher compression ratio is obtained because of contra-prerotation and because of more efficient compression by utilizing the supersonic compression shocks in the diffuser.

The total head rise, $\Delta \angle$, in the compressor is given by the following equation:

$$\Delta \angle = \frac{1}{g}(C_{u_2}U_2 - C_{u_1}U_1)$$

where $C_{u_2}$=projection of absolute exit velocity $C_2$ on the peripheral velocity $U_2$ (see Fig. 2C).
$C_{u_1}$=projection of absolute velocity $C_1$ on the peripheral velocity $U_1$ (see Fig. 2B).
$U_1$=entry peripheral velocity.
$U_2$=exit peripheral velocity.
$g$=acceleration due to gravity.
$\Delta \angle$=total head rise in feet.

In the centrifugal compressors known to the prior art the first two terms $C_{u_2}$ and $U_2$ are considerably smaller than in the compressor illustrated in Figures 2B and 2C since no supersonic velocity can be used with the existing diffusers. Therefore, there is a marked gain in the compression ratio obtainable with the disclosed compressor because of the use of the supersonic exit velocity $C_2$ and very high peripheral velocity $U_2$.

The gain in the compression also extends to the term $C_{u_1}$, $U_1$, which is either negative or zero in the existing centrifugal compressors, but is significant and positive in the compressor disclosed in Figures 2B and 2C because of the contra-prerotation of the air in the prerotation stage 200. The vector diagram $C_1 W_1 U_1$ indicates that the projection of $C_1$ on $U_1$ will have an opposite sign to that of $U_1$; therefore $-(-C_{u_1}) \cdot (U_1)$ gives a positive sign to the second term in Equation 1.

Because of the relative complexity of some portions of the structure of the power plant, and lack of appropriate terms, it becomes necessary to define some of the terms which will be used in the claims. As illustrated in Fig. 1, the circumferential duct 77 which connects the output of the first stage, or rotor, 22 of the compressor to the second stage, or rotor, 24 of the compressor is positioned on its input side around the "periphery" of blade 68 of the first rotor. The term "periphery," as used in the claims, indicates, or means, that the rotor 22 discharges into duct 77 and duct 77 completely surrounds the "cylindrical locus" defined by the "lagging edges" of the vanes or blades 68. Diffuser 72 is positioned on the input side of duct 77. Duct 77 also completely surrounds the input side of rotor 24. The output duct 78 also completely surrounds the output portion of rotor 24, so that the compressed air discharges into duct 78. Duct 78 discharges into the toroidal chamber 120 and, therefore, ducts 77 and 78 must cross each other in the manner indicated in Fig. 1. The term "a plurality of branch ducts," means that duct 77 has a reasonable number of spaced "branch ducts" such as four, six, or eight, around the periphery of the compressor which are uniformly distributed in spaced relationship with respect to each other around the outer periphery of the compressor in that vertical plane where the ducts 77 and 78 cross each other. A similar plurality of branch ducts is used for conveying the compressed air from the output side of the second rotor 24 of the compressor to the input ports 406 of the toroid. The branch ducts 78a, 78b, 78c, etc., (only duct 78 is visible in Fig. 1) are also uniformly spaced with respect to each other around the outer periphery of the second rotor of the compressor where they cross the branch ducts 77a, 77b, 77c, etc. (Only duct 77 is visible in Fig. 1.) The branch ducts 78a, 78b, etc., are interlaced or intermeshed, in alternating manner, with the branch ducts 77. The meaning of the term "interlaced, or intermeshed, in alternating manner," is that as one progresses around the periphery of the compressor in the vertical plane where the branch ducts cross each other's paths, one will encounter, for example, the branch duct 77a which may span an angle of, say, 35°. Continuing in the same direction along the above periphery, and in the above plane, one then will encounter the branch duct 78a which may span an angle of 25° along the same periphery. One then will encounter the second branch duct 77b, then the second branch duct 78b, then 77c, then 78c, etc., in alternating manner until the path of 360° is completed. The above angles of 35° and 25° indicate that duct 77a is somewhat wider than duct 78a. This is so because the density of the air flowing through duct 77a, etc., is not as high as the density of the air flowing through duct 78a, etc., the air pressure in duct 78a being higher than that in duct 77a because of the additional compression obtained in the second stage of the compressor. In the above example, it is assumed that there are six branch ducts 77a—77f uniformly distributed around the periphery of the compressor, the branch ducts 78a—78f fitting into the respective gaps, or spaces, or holes, which are provided in duct 77, with the result that the branch ducts of the first set 77 are "interlaced or intermeshed in alternating manner," with the branch ducts of the second set. This is indicated by dotted lines in Fig. 1 which cross the branch duct 78, thus indicating that in Fig. 1 the branch duct 77 is located behind the branch duct 78.

As clearly indicated in Figs. 4 and 7, the input and the output ports 406 and 408 are also positioned in "interlaced, or interspersed, in alternating manner," around "the outer periphery of the toroidal combustion chamber" 120. As also clearly illustrated in Fig. 4, and also in Fig. 1, the meaning of the term "outer periphery of the toroidal combustion chamber," means that portion of the inner toroid wall 80 which is beyond the outer half of the inner toroid 120. This is clearly illustrated by the position of the input port 406 in Fig. 1 which occupies the extreme upper part of the cross-section of toroid 120 as it is seen in Fig. 1. If the lower half of the same toroid were also illustrated in Fig. 1, then the input and the output ports would appear at the bottom portion of the same toroidal chamber 120.

Because of lack of any better term, the ports at times will be defined in the claims as being "wedge-shaped" ports, the wide portion or the base portion of the wedge-shaped input ports opening into the output portion of duct 78 to receive compressed air from the compressor. This is shown clearly in Fig. 1. The similarly spaced and shaped output ports 408 are opening into a circumferential duct 85 which is indicated in part by solid, and, in part, by dotted lines 130, 151 and 152 in Fig. 1. Duct 85 has a plurality of the branch ducts which are "interspersed, or interlaced, in alternating manner," with the branch ducts of the circumferential duct 41 as indicated in Fig. 1 by the solid lines 47 and 48 defining the walls of the respective branch ducts.

The presence of the solid and dotted lines in this figure also indicates that these branch ducts, where the paths of the two sets of the branch ducts cross, or are located around the same circumference, interlace each other in alternating manner as one progresses around the 360° periphery of that portion of the power plant which is directly to the right of the combustion chamber 12, as viewed in Fig. 1. The input ports 406 and the output ports 408 are called, for lack of a better term, as "ports," and also as being "wedge-shaped" ports. It is obvious that these ports, when viewed in the manner illustrated in Fig. 7, indeed appear as strictly "wedge-shaped" ports. However, the term "wedge-shaped" is only an approximation of their true geometry. These ports also have side-walls 84 which are positioned in a plurality of radial planes converging toward the center of the toroid, or the axis of the power plant, as clearly illustrated in Fig. 4. Accordingly, the ports are "wedge-shaped" in the direction of the axis of the power plane (see Fig. 7) and also in the radial direction, as shown in Fig. 4. Therefore, the ports do not conform to the conventional geometry of the wedge defined by two flat surfaces subtending two equal triangles, on each side of the surface, and having a rectangular head. The shape of the ports is further complicated by the fact that their apices are not straight lines but curved since these ports, at their apices, follow the circularly shaped surface of the wall 80 of the inner toroid 120. This is clearly illustrated in Fig. 1 where the input port 406 is wide open on the left side to receive the compressed air from compressor 11 or, more precisely, from duct 78, and it is closed off completely from turbine 34 by means of the upper wall portion 110 of the toroid 80. Therefore, the compressed air enters port 406 and, thereafter, is discharged into the inner toroid 120 by following first the side-walls 84 and then the wall portion 110 of the toroid. It then follows the remaining wall portion of the toroid. This air is converted into hot gases and these hot gases are then discharged through the output ports 408 by entering the output ports, whereupon they are conveyed to the turbine through the circumferential duct 85 and its "branch ducts" which were described previously.

Duct 85, on its input side, or that side which connects it to the inner toroid 120, is also interlaced with the ducts 41, 41a, 41b, 41c, etc., which convey the air to the intertoroid duct 81. It may be recalled that the space between the two toroids is used for cooling the wall 80 of the inner toroid. This flow of air is illustrated by arrows 113 in Fig. 1.

The term "lagging portions" and "the leading portions" will also be used in the claims in describing the vanes 68 of the compressor, the blades 49 and 240 of the prerotation stage, and the airfoils, or blades, 214 of the diffuser. The term "lagging portion" denotes that part of the vanes which is at the output portion of the flow channel under consideration. For example, it is that portion of vane 68 which is adjacent to diffuser 72 or diffuser 74. The leading portion of vane 68 is that portion which is adjacent to the cambered airfoils 49 or 240 of the prerotation stages 43, 44, and 49. The same terms "lagging" and "leading" will also be used for describing, in the claims, flat surfaces 224 and 218, producing the wedge-shaped "leading" portions of the airfoils 214, Fig. 2C. The leading surfaces are surfaces 224 and the lagging surfaces are surfaces 218. Surface 224 is referred to in the claims as the leading surface because it is ahead of surface 218 when the two surfaces are "viewed" by rotor 22 or 24 also illustrated in Fig. 2C. The direction of rotation of this rotor is illustrated by an arrow 240 which indicates that rotor 22 rotates in the clockwise direction. Therefore, the compressed air reaching rotor 22 will first encounter surface 224, which for this reason is called the leading surface of airfoil 214, and then, at a "later moment," surface 218, which is called the lagging surface. Accordingly, the direction of air flow determines as to whether the surface is a leading or lagging surface. The difference in time, connoted by the terms "leading" and "lagging" may be equal to zero when, for example, one applies this terminology to the very tip 212 of the wedge formed by the surfaces 218 and 224.

It also becomes necessary to define the geometrical position of these two surfaces 218 and 224 with respect to the direction of the absolute output velocity $C_2$ because these two surfaces are placed in a diffuser at such angles with respect to $C_2$ so as to make surface 218 parallel to the absolute velocity $C_2$ and surface 224 forming a relatively small sharp angle with velocity $C_2$. It is impossible to relate the above two surfaces to any other part of the compressor such as, for instance, the radial vane 260, 261, 262, etc., or any stationary portion of the main frame 10. It is quite obvious that the angle, or the position of the above vanes 260, 261, 262, etc., changes constantly as rotor 22 rotates around its axis, and there is no angular relationship between the surfaces 218, 224 and frame 10 because this angular relationship changes from blade to blade as one progresses around 360° of the diffuser. Yet the vectorial direction of the absolute velocity $C_2$ remains constant as long as the compressor is operated at rated speed, and surface 218 must be parallel to the exit absolute velocity $C_2$ in order to produce proper operation of the compressor. The direction of velocity $C_2$ is not an imaginary quantity but is rigidly fixed and known from the known design of the compressor which determines the magnitude as well as the direction of the vector $C_2$ as one proceeds around the periphery of the compressor, i. e., the angle between $U_2$ and $C_2$ is a fixed angle when compressor is operated at a given speed corresponding to the design point of the power plant.

What is claimed as new is:

1. A gas turbine power plant comprising a shaft, a combustion chamber having the shape of a toroid, said toroid having input and output ports distributed around the outer periphery of said toroid and being interlaced, or intermeshed, in alternating manner, with respect to each other, said shaft passing through the central opening of said toroid, a centrifugal compressor having first and second serially connected rotors mounted on said shaft, each of said rotors having an input side for receiving air and an output side for discharging compressed air, a centripetal turbine mounted on said shaft, a first circumferential output duct connecting the output side of the first rotor of said compressor to the input side of the second rotor of said compressor, said first duct having a plurality of first branch ducts uniformly distributed in spaced relationship with respect to each other around the outer portion, or periphery, of said first duct to form a plurality of walled-off apertures in said first duct, a second circumferential output duct for conveying compressed air from the output side of the second rotor of said compressor to the input ports of said toroid, said second duct having a plurality of second branch ducts uniformly distributed in spaced relationship with respect to each other around the outer portion, or periphery, of said second duct and being interlaced, or intermeshed, in alternating manner, with the first branch ducts by passing through the respective apertures of the first duct, and a circumferencial output duct connecting the output ports of said toroid to said turbine.

2. A gas turbine power plant as defined in claim 1 in which said centripetal turbine includes a single-entry-double-exit rotor.

3. A gas turbine power plant as defined in claim 2 in which said gas turbine rotor has two outer side-walls, and a plurality of centrifugal compressor blades mounted along the outer surface of each side-wall.

4. A gas turbine power plant as defined in claim 1 in which said first and second compressor rotors have first and second stationary, axial, contra-prerotation stages, respectively, said contra-prerotation stages each including a plurality of airfoil blades cambered in the direction opposite to the direction of rotation of said compressor rotors.

5. A centrifugal dynamic compressor for compressing a fluid, said compressor comprising a rotor having a plurality of impeller vanes uniformly distributed around said rotor, each vane having a cambered input end beginning with an input edge, said vanes terminating in output edges, the input edges lying in a first plane perpendicular to the axis of rotation of said rotors and the output edges defining a cylindrical locus concentric with said axis of rotation, the camber of the input ends being in the direction of rotation of said rotor, a stationary input flow channel defined by two curved, or cambered, side walls spaced from each other to form said curved flow channel having a centripetal flow portion and an axial flow portion, the side walls of the centripetal flow portion of said channel converging toward the axis of rotation of said rotor to produce a centripetal flow path for said fluid and for gradually accelerating said fluid in the centripetal direction and toward said axis, said centripetal flow portion then merging into said axial flow portion defined by two cylindrically shaped portions of said side-walls, the cylindrical portions of said side walls both being concentric with said axis, a plurality of airfoils mounted between said two side walls, said airfoils beginning at the lagging, or inner, end of said centripetal flow portion of said channel and extending throughout the axial flow portion of said channel, the inner, or the lagging, portions of said airfoils being cambered in the direction opposite to the direction of rotation of said rotor, the cylindrical portions of said side walls and said airfoils defining flow accelerating and flow directing curved ducts, each duct having a centripetal flow portion at the entry into said duct and a mixed flow portion at the exit from said duct, said mixed flow of the fluid, upon its exit from said duct, being represented by an absolute velocity $C_1$ having a tangential component $C_t$ and an axial component $C_a$, said axial component being parallel to said axis of rotation and said tangential component being tangential with respect to the cylindrical portions of said side walls and perpendicular to said axial component, the lagging ends, or the lagging edges, of the airfoils of said prerotation stage lying in a plane perpendicular to the axis of rotation of said rotor and being directly adjacent to and parallel to said first plane.

6. A centrifugal compressor comprising a rotor having a plurality of vanes, said vanes having cambered leading portions, said leading portions having leading edges lying in a first plane perpendicular to the axis of rotation of said rotor and radially-positioned lagging portions discharging a compressed fluid at an absolute velocity $C_2$ when said compressor is in operation at its rated speed, a stationary contra-prerotation stage having two curved side walls each having a radially positioned portion merging into an axially positioned portion concentric with said axis, a plurality of entry airfoils lying in respective radial planes passing through said axis and being positioned between the radially positioned portions of said side-walls and defining the input portion of said stationary contra-prerotation stage for directing, in a centripetal direction, a working fluid into said compressor; plurality of cambered exit airfoils positioned between the lagging portions of said side-walls and defining the output portion of said stage, said exit airfoils being cambered in the direction opposite to the direction of rotation of said rotor to produce said contra-prerotation in the fluid leaving said contra-prerotation stage, said exit airfoils and said side-walls terminating in lagging edges all lying in a second plane parallel to and directly adjacent to said first plane, and a diffuser surrounding the outer periphery of said rotor, said diffuser having a plurality of cambered blades having leading wedge-shaped portions formed by the respective lagging and leading surfaces of the respective blades, the lagging surface of said blade being parallel to said velocity $C_2$ and the leading surface forming a sharp angle with the lagging surface for producing at least an oblique shock in said fluid upon its entry into said diffuser.

7. A diffuser for a centrifugal compressor comprising two side walls, a plurality of blades uniformly distributed along the periphery of said diffuser, said blades having sharp leading edges produced by intersection of first and second surfaces, said first surface being parallel to the direction of fluid flow, and said second surface being inclined to said direction to produce oblique shocks in the fluid entering said diffuser.

8. A diffuser for a centrifugal compressor for compressing a fluid, discharged into said diffuser by a rotor of said compressor, said diffuser including two side-walls and a plurality of cambered blades between said side-walls, each blade comprising a first flat surface parallel to the absolute velocity of said fluid directly at the entry into said diffuser when said compressor is operated at its normal angular velocity, and a second flat surface forming a sharp angle with said first surface, the intersection of said first and second surfaces producing a leading edge on said blade, said first surface being a lagging surface, and said second surface being a leading surface with respect to the normal rotation of the rotor of said compressor, said second leading flat surface producing at least an oblique shock in said fluid upon its entry into said diffuser.

9. A diffuser as defined in claim 8 in which the remaining portion of said blade constitutes a curved airfoil merging into said first and second surfaces, the opposed surfaces of adjacent airfoils defining a curved diffusion channel having a radial exit.

10. A diffuser for a centrifugal compressor, said diffuser comprising two parallel side walls surrounding the output portion of said compressor and a plurality of blades between said side walls, the leading portion of each blade being wedge-shaped, having first and second surfaces, the first surface of said wedge being parallel to the direction of flow of fluid through the leading portion of said diffuser, and the second surface of said wedge being at an angle with respect to said first surface for producing at least an oblique compression shock in said fluid.

11. A gas turbine power plant comprising serially connected multistage centrifugal compressor having an output stage, a multistage centripetal turbine having an input portion, a toroidal combustion chamber between the output stage of said compressor and the input portion of said turbine, a number of input ports, and an equal number of output ports circumferentially distributed around the outer circumferential portion of said toroidal combustion chamber, each input port having an output port on each side of said input port, said input ports being interlaced, or intermeshed, in alternating manner, with said output ports, said input ports being connected to said output stage of said compressor, and said output ports being connected to the input portion of said turbine.

12. A gas turbine power plant comprising a shaft, a centrifugal compressor having a rotor mounted on one end of said shaft, a centripetal turbine mounted on the other end of said shaft, a stationary combustion chamber having the shape of a toroid, said chamber being positioned between said compressor and said turbine, said toroid surrounding the central portion of said shaft, an input duct connecting the outer periphery of said toroid to said compressor, and an output duct connecting the same outer periphery of said toroid to said turbine.

13. A gas turbine power plant as defined in claim 12 in which said combustion chamber includes a plurality of peripherally, or circumferentially, positioned input and output ports, said input ports alternating with said output ports, each input port having an output port on each side of said input port, and each output port having an input port on each side of said output port, said input ports being intermeshed with said output ports.

14. A gas turbine power plant as defined in claim 12 in which said combustion chamber comprises first and second toroids, said first toroid being in spaced relationship with respect to and within said second toroid, a fuel system connected to said first toroid, said input and output ducts being connected to both toroids, said first toroid being the combustion chamber proper, and the space between said toroids receiving compressed air for cooling said first toroid.

15. A gas turbine power plant comprising a multisage centrifugal compressor, each stage having a stationary prerotation stage, and a rotor having an axial input portion merging into a radial output portion; a stationary combustion chamber shaped as a toroid and having a plurality of input ports and the same plurality of output ports, said input ports being intermeshed, or interlaced, in alternating manner with said output ports, said ports approximating a wedge-shaped configuration and being circumferentially positioned around the outer periphery of said toroid; a single intake-dual exhaust, centripetal turbine for driving said compressor, and a circumferential duct connecting the input of said turbine to the output ports of said toroid.

16. A gas turbine power plant as defined in claim 15 in which said turbine has a single rotor, said rotor having a single peripheral radial entry for gases entering said turbine, and two axial exits for expanded gases, said exits being axial exits pointing in the opposite directions, said turbine also including two opposed outer side-walls, a plurality of centrifugal compressor blades mounted on the outer surface of each side-wall, and duct means fluid dynamically connecting said centrifugal compressor blades on the side-walls of said turbine to ambient air.

17. A gas turbine power plant comprising a shaft, a centrifugal compressor mounted on said shaft, said compressor including first and second rotors, each having an input side and an output side, a stationary, axial contra-prerotation stage coupled to the input side of each rotor, said rotors being mounted back to back on said shaft with the inputs pointing in two diametrically opposite directions, a first set of ducts uniformly distributed around the periphery of the output side of the first rotor and the input side of said second rotor for serially connecting said first and second rotors, a combustion heat generator having the shape of a toroid, said shaft passing through a central opening in said toroid, a second set of ducts connecting the output of said second rotor to said combustion heat generator, said first and second ducts interleaving each other, a centripetal turbine mounted on said shaft, and a third set of ducts uniformly distributed around the periphery of said turbine and the input portion of said third duct being fluid dynamically connected to the outer periphery of said toroid for connecting said heat generator to said turbine.

18. A gas turbine power plant as defined in claim 17 in which said centripetal turbine has a stationary flow-directing stage including a plurality of airfoils uniformly distributed around the outer periphery of said turbine rotor, said airfoils having cambered inner portions, the direction of camber being in the direction of rotation of said turbine rotor, a plurality of centrifugal compressor-type vanes along outer surface of side walls of said turbine rotor, and ambient air ducts fluid-dynamically connected to said vanes for cooling said turbine rotor with said ambient air.

19. A gas turbine power plant comprising a centrifugal compressor having an output end for discharging compressed air from said compressor, a first circumferential compressor output duct surrounding the output end of said compressor, a centripetal turbine having an input end for receiving heated gases, a second circumferential turbine input duct for conveying heated gases into said turbine, a combustion chamber mounted between said compressor and turbine, said chamber including an inner toroid and an outer toroid, said outer toroid surrounding and being in spaced relationship with respect to the inner toroid, a first set of input ports located along the outer peripheral portion of said inner toroid, a second set of ouput ports located along the same outer peripheral portion of said inner toroid, each of said input ports being defined by two side-walls positioned in wedge-shaped manner within said inner toroid, said inner and outer toroids having circumferential openings for connecting said toroids, and said input ports to said first duct, said input ports having open ends opening into said first duct for introducing compressed air into said inner toroid, said side-walls being common side-walls for defining the wedge-shaped output ports opening into said second duct, the apices of the wedge-shaped input ports pointing toward said turbine and the apices of said wedge-shaped output ports pointing toward said compressor, said input and output ports being uniformly spaced around the periphery of said toroid, and the input ports interlacing, or intermeshing, in alternating manner, the output ports.

20. A gas turbine power plant as defined in claim 19 which also includes interlaced, or intermeshed, input and output ports for a duct formed by and located between the walls of said inner and outer toroids for conveying compressed air into and away from said last recited duct.

21. A centrifugal compressor for compressing a fluid, comprising a plurality of stationary contra-prerotation channels, rotatable compression channels, and stationary supersonic diffusion channels, the axial section of one set of said channels having a U-shaped configuration, the contra-prerotation channel being located in one leg of said U, and the remaining channels in the other leg of said U, said contra-prerotation and compression channels meeting each other midway along said U, said contra-prerotation channels having a plurality of airfoils cambered in the direction opposite to the direction of rotation of said compression channels, said compression channels having a plurality of rotatable vanes cambered in the direction of rotation of said compression channels and said diffusion channels having a plurality of blades having wedge-shaped leading edges having first and second surfaces, said first surface being a lagging surface and being parallel to the direction of flow of said fluid upon its emergence from the compression channel, and said second surface being a leading surface and forming a sharp angle with the first surface for creating at least an oblique supersonic shock in said fluid for supersonically diffusing said fluid upon its entry into said diffusion channel.

References Cited in the file of this patent

UNITED STATES PATENTS

| | | |
|---|---|---|
| 1,031,093 | Smith | July 2, 1912 |
| 1,063,788 | Firey | June 3, 1913 |
| 1,075,300 | Moss | Oct. 7, 1913 |
| 2,069,640 | Beardsley | Feb. 2, 1937 |
| 2,157,002 | Moss | May 2, 1939 |
| 2,213,939 | Jendrassik | Sept. 3, 1940 |
| 2,384,251 | Hill | Sept. 4, 1945 |
| 2,438,426 | Whittle | Mar. 23, 1948 |
| 2,469,439 | Lundquist | May 10, 1949 |
| 2,471,892 | Price | May 31, 1949 |
| 2,474,410 | Aue | June 28, 1949 |
| 2,493,873 | Hill | Jan. 10, 1950 |
| 2,538,179 | Weinhardt | Jan. 16, 1951 |
| 2,543,923 | Mixsell | Mar. 6, 1951 |
| 2,567,079 | Owner et al. | Sept. 4, 1951 |
| 2,578,617 | Watson | Dec. 11, 1951 |
| 2,623,356 | Coanda | Dec. 30, 1952 |
| 2,623,688 | Davidson | Dec. 30, 1952 |
| 2,641,191 | Buchi | June 9, 1953 |
| 2,648,491 | Wood | Aug. 11, 1953 |

FOREIGN PATENTS

| | | |
|---|---|---|
| 24,403 | Great Britain | Nov. 4, 1907 |
| 555,308 | Great Britain | Aug. 17, 1943 |
| 622,394 | Great Britain | May 2, 1949 |
| 66,352 | Denmark | Feb. 28, 1948 |
| 102,821 | Switzerland | Jan. 2, 1924 |